United States Patent
Matsuzawa (10) Patent No.: US 8,934,190 B2
(45) Date of Patent: Jan. 13, 2015

(54) PIEZOELECTRIC DEVICE DRIVE METHOD, PIEZOELECTRIC DEVICE DRIVE APPARATUS, AND MAGNETIC DISK DEVICE

(75) Inventor: Takuji Matsuzawa, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 72 days.

(21) Appl. No.: 13/570,144

(22) Filed: Aug. 8, 2012

(65) Prior Publication Data

US 2013/0188277 A1 Jul. 25, 2013

(30) Foreign Application Priority Data

Jan. 24, 2012 (JP) ................... 2012-012405

(51) Int. Cl.
*G11B 21/02* (2006.01)

(52) U.S. Cl.
USPC .......................................... 360/75

(58) Field of Classification Search
None
See application file for complete search history.

(56) References Cited

U.S. PATENT DOCUMENTS

| 5,384,507 | A | * | 1/1995 | Takada et al. ............. 310/317 |
| 5,568,003 | A | * | 10/1996 | Deck ..................... 310/316.01 |
| 7,041,963 | B2 | * | 5/2006 | El Rifai et al. ............. 250/234 |
| 7,085,083 | B2 | * | 8/2006 | Zhu et al. .................... 360/31 |

FOREIGN PATENT DOCUMENTS

| JP | 2000-182340 A | 6/2000 |
| JP | 2000-285621 A | 10/2000 |
| JP | 2000-298963 A | 10/2000 |
| JP | 2001-338477 A | 12/2001 |

* cited by examiner

*Primary Examiner* — Wayne Young
*Assistant Examiner* — Mark Fischer
(74) *Attorney, Agent, or Firm* — Knobbe Martens Olson & Bear LLP (57) ABSTRACT

According to one embodiment, a piezoelectric device drive method includes measuring gains including a first gain by applying voltages including a first voltage to a piezoelectric device at a first timing, calculating gain characteristics associated with the applied voltages from the measured gains, measuring a second gain by applying the first voltage to the piezoelectric device at a second timing, correcting the calculated gain characteristics based on the first gain and the second gain, and calculating a third gain based on the corrected gain characteristics and the second gain in a case where a second voltage other than the first voltage is applied.

18 Claims, 7 Drawing Sheets

PIEZOELECTRIC DEVICE DRIVE METHOD, PIEZOELECTRIC DEVICE DRIVE APPARATUS, AND MAGNETIC DISK DEVICE

CROSS-REFERENCE TO RELATED APPLICATIONS

This application is based upon and claims the benefit of priority from prior Japanese Patent Application No. 2012-012405, filed Jan. 24, 2012, the entire contents of which are incorporated herein by reference.

FIELD

Embodiments described herein relate generally to a piezoelectric device drive method, piezoelectric device drive apparatus, and magnetic disk device configured to accurately drive a piezoelectric device.

BACKGROUND

It is known to the public that a piezoelectric device is used as an actuator. For example, a piezoelectric device has begun to be used as an actuator configured to drive a magnetic head of a hard disk drive. Normally, the head is fixed to a rotatable arm and, when the arm is rotated by a voice coil motor (VCM), the head is moved to a desired position on the disk. In recent years, in order to enhance the accuracy in positioning, a dual-stage actuator in which another accurate drive mechanism is added in the vicinity of the magnetic head separately from the VCM configured to drive the whole arm has been developed. A microactuator serving as the second stage is added to a distal end of the arm of the VCM serving as the first stage. A piezoelectric device is mounted on the suspension and, by applying a voltage to the piezoelectric device, the piezoelectric device expands or contracts to displace the magnetic head attached to the distal end of the suspension in the track direction.

Each of the piezoelectric devices varies in gain/voltage characteristics and, in order to accurately drive the actuator utilizing the piezoelectric device, it is necessary to measure the gain for each device to adjust the drive voltage. The gain of the piezoelectric device has voltage dependence, and hence it is necessary to obtain the gain by exciting the piezoelectric device by using a voltage that's actually used (on-track state). However, in general, the voltage of the on-track state is small, and hence the amplitude of the piezoelectric device is also small, and the measurement accuracy of the gain becomes poor. In order to improve the measurement accuracy, there arises the need to carry out measurement a plurality of times, and average the measurement results, and hence the overall measurement requires a lot of time.

In the conventional piezoelectric device drive apparatus, in order to compensate for the variation in gain, and improve the positioning accuracy, there has been a problem that the measurement of the gain takes a long time.

DETAILED DESCRIPTION

Various embodiments will be described hereinafter with reference to the accompanying drawings.

In general, according to one embodiment, a piezoelectric device drive method includes measuring gains including a first gain by applying voltages including a first voltage to a piezoelectric device at a first timing, calculating gain characteristics associated with the applied voltages from the measured gains, measuring a second gain by applying the first voltage to the piezoelectric device at a second timing, correcting the calculated gain characteristics based on the first gain and the second gain, and calculating a third gain based on the corrected gain characteristics and the second gain in a case where a second voltage other than the first voltage is applied.

Figure 1:
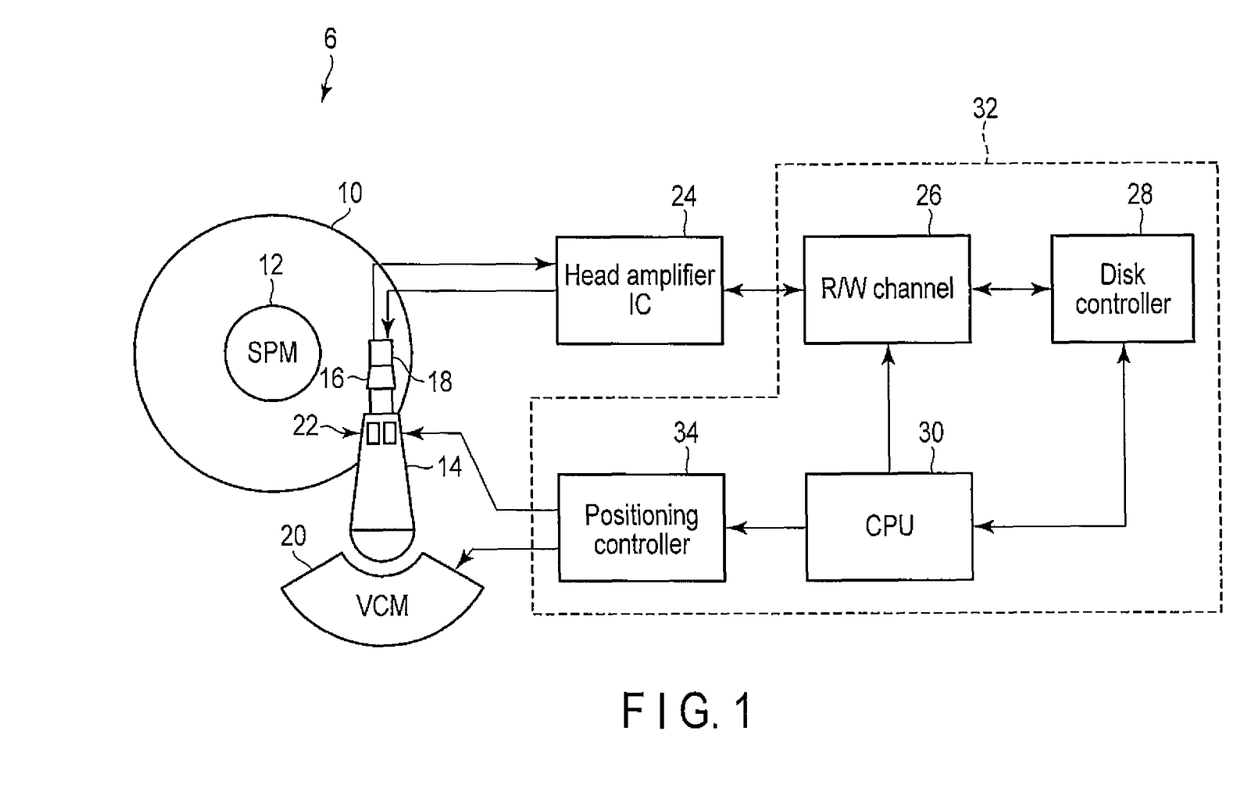
FIG. 1 is a block diagram showing a configuration example of an important part of a magnetic disk device of an embodiment.

FIG. 1 is a block diagram showing an important part of a magnetic disk device associated with an embodiment.

The magnetic disk device is roughly constituted of a head-disk assembly (HDA) 6, head amplifier integrated circuit (hereinafter referred to a head amplifier IC) 24, and hard disk controller (HDC) 32.

The HDA 6 includes a magnetic disk 10 serving as a recording medium, spindle motor (SPM) 12, arm 14, and voice coil motor (VCM) 20. The magnetic disk 10 is rotated by the SPM 12. A load beam 16 is attached to a distal end of the arm 14, and a magnetic head 18 is attached to a distal end of the load beam 16. The arm 14 controls to move the magnetic head 18 to a desired position on the magnetic disk 10 by drive of the VCM 20. Furthermore, a pair of piezoelectric devices (for example, Pb (Zr, Ti)O$_3$) 22 is arranged in the vicinity of an attachment part of the load beam 16 of the arm 14. By applying voltages to the pair of piezoelectric devices, each of the right and left piezoelectric devices expands or contracts in opposite phase, and it is possible to displace the magnetic head 18 at the distal end of the load beam 16 in the radial direction (cross-track direction) on the magnetic disk 10. In this way, a two-stage actuator in which the piezoelectric device-driven load beam serving as the second stage part is added to the distal end of the VCM-driven arm serving as the first stage part is realized. Hereinafter, the piezoelectric device 22 is also referred to as a microactuator (hereinafter MA).

The magnetic head 18 has a structure in which a read head element and write head element are mounted on one slider separately from each other. The read head element reads data recorded on the magnetic disk 10. The write head element writes data to the magnetic disk 10.

The head amplifier IC 24 includes a read amplifier and write driver. The read amplifier amplifies a read signal read by the read head element, and transmits the amplified read signal to a read/write (R/W) channel 26. On the other hand, the write driver transmits a write current corresponding to the write data output from the R/W channel 26 to the write head element.

The HDC 32 includes the R/W channel 26, a disk controller 28, microprocessor (CPU) 30, and positioning controller 34. The R/W channel 26 includes a read channel configured to execute signal processing of read data, and write channel configured to execute signal processing of write data. The disk controller 28 executes interface control configured to control data transfer between a host system (not shown) and the R/W channel 26. The CPU 30 is a main controller of the drive, executes servo control configured to carry out positioning of the magnetic head 18 through the positioning controller 34, and executes read/write control of data through the head amplifier IC 24. It should be noted that the positioning controller 34 may be realized by hardware, and may also be realized by software (firmware).

Figure 2:
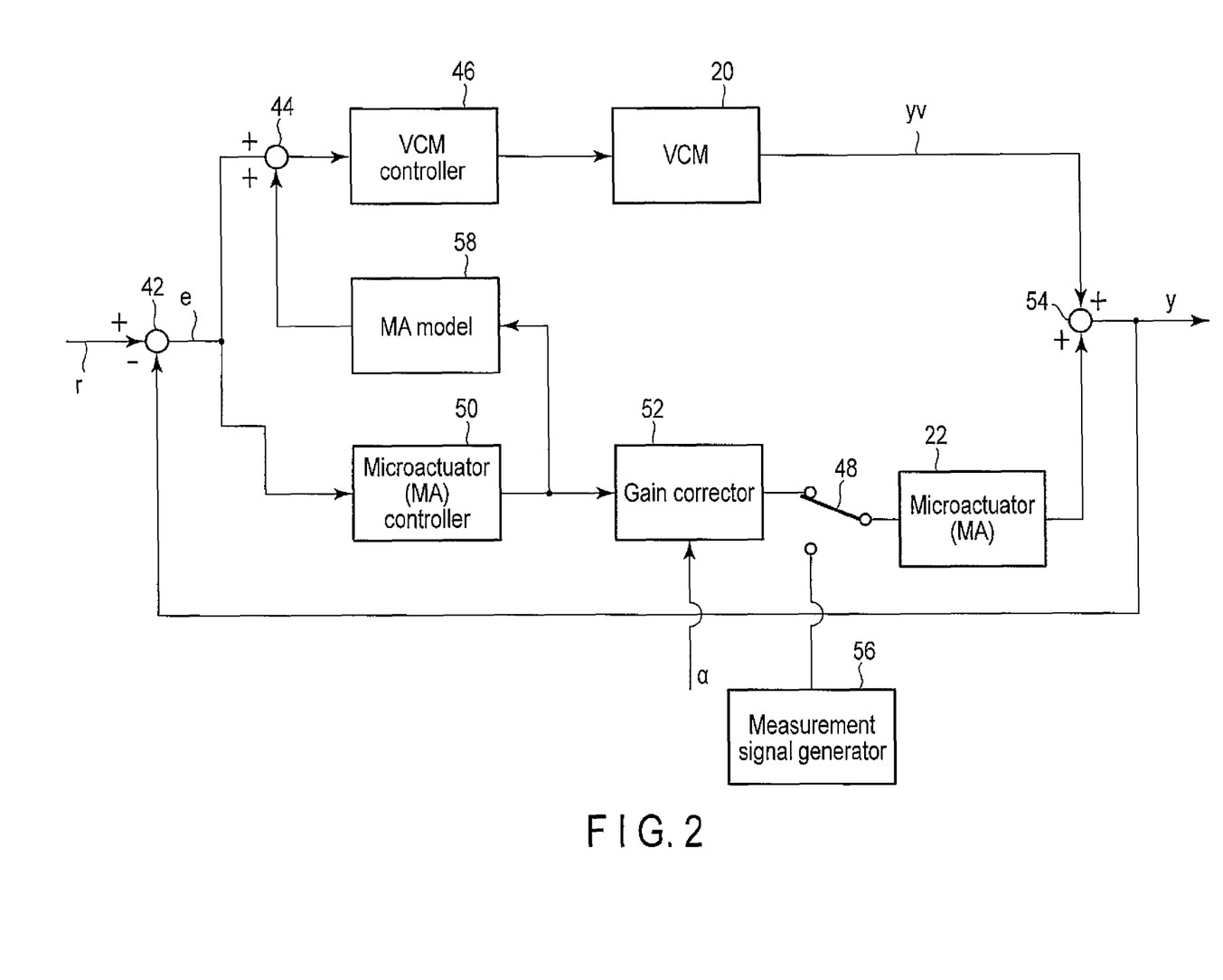
FIG. 2 is a functional block diagram associated with head positioning of the embodiment.

FIG. 2 is a functional block diagram associated with head positioning. A target position signal r indicating a target position of the head is input to a (+) terminal of an adder 42, and head position signal y indicating the current position of the head is input to a (−) terminal of the adder 42, whereby a position error signal e is obtained. The position error signal e is input to a first (+) terminal of an adder 44, and is also supplied to a microactuator controller (hereinafter referred to as MA controller) 50. An output of the adder 44 is supplied to a VCM controller 46, thereby controlling a drive amount of the VCM 20. The VCM 20 outputs a VCM position signal $y_v$, and the signal $y_v$ is input to a first (+) terminal of an adder 54.

An output of the MA controller 50 is supplied to a first terminal of a selector 48 through a gain corrector 52. An output of the selector 48 is supplied to the MA 22. A correction coefficient α of the gain corrector 52 is supplied from the CPU 30. In order to compensate for the variation in gain-voltage characteristics of the MA 22, the gain corrector 52 corrects the drive voltage of the MA 22 which is the output of the MA controller 50 in accordance with the variation of the characteristics.

An output of a measurement signal generator 56 is input to a second terminal of the selector 48. An output voltage of the measurement signal generator 56 is determined by a control signal from the CPU 30. Switching of the selector 48 is also controlled by a control signal from the CPU 30. At the time of measurement of the gain of the piezoelectric device, a measurement signal is supplied to the MA 22 through the selector 48.

The output of the MA controller 50 is input to a second + terminal of the adder 44 through a microactuator model (hereinafter referred to as an MA model) 58 configured to estimate an MA position signal $y_m$. The MA position signal $y_m$ output from the MA 22 is input to a second + terminal of the adder 54. The adder 54 adds the VCM position signal $y_v$, and MA position signal $y_m$ together to create the head position signal y.

In this embodiment, the two-stage actuator in which the whole arm 14 is driven by the VCM 20, and the load beam 16 at the distal end of the arm 14 is displaced by the MA 22 is employed for the positioning of the magnetic head 18, and hence the two actuators of the VCM 20 and MA 22 are included in the actuator, thereby constituting a complicated control system. Accordingly, the gain measurement of the MA 22 is carried out in a state where the output of the MA controller 50 is made 0, and the magnetic head 18 is positioned (on-track) by using only the VCM 20 without using the MA 22, by applying a gain measurement signal d to the MA 22. That is, the selector 48 is switched to the measurement signal generator 56 side. In this state, it is possible to obtain the gain $P_M$ of the MA 22 from the ratio of the input voltage d of the MA 22 to the position error signal e (e/d=$P_M$/(1+$P_V C_V$)), and sensitivity function (1/(1+$P_V C_V$)) of a case where the magnetic head 18 is positioned by using only the VCM 20.

Here, although $P_V$ is the gain of the VCM 20, and $C_V$ is the gain of the VCM controller 46, it is not necessary for the characteristics of the VCM controller 46 of a case where the magnetic head 18 is positioned (on-track) by using both the VCM 20 and MA 22, and characteristics of the VCM controller 46 of a case where the output of the MA controller 50 is made 0, and the magnetic head 18 is positioned by using only the VCM 20 without using the MA 22 to be identical to each other.

It is known that the gain $P_M$ of the MA 22 depends on the drive voltage input to the MA 22 and, in order to accurately carry out positioning, it is necessary to measure the gain by using a drive signal of the MA 22 of a voltage close to the voltage at the time of on-track. However, in general, the voltage at the time of on-track is small, both the drive voltage of the MA 22 for measurement, and displacement of the MA 22 are also small, and hence the displacement of the MA 22 caused by measurement signal in the position error signal is small, and the measurement error of the gain of the MA 22 becomes large. When it is attempted to improve the measurement accuracy of the gain, it is necessary to carry out measurement a plurality of times, and average the measurement results, whereby it is necessary to extend the measurement time of one time, and the measurement requires a long time.

On the other hand, the gain of the MA 22 changes over time, and hence it is necessary to carry out gain measurement of the MA 22 at an appropriate time even after shipment thereof. Under the situation in which the MA 22 is actually used, there are requests to terminate the gain measurement of the MA 22 within the shortest possible time, and request to obtain the gain of the MA 22 within a short time and with high accuracy.

Figure 3:
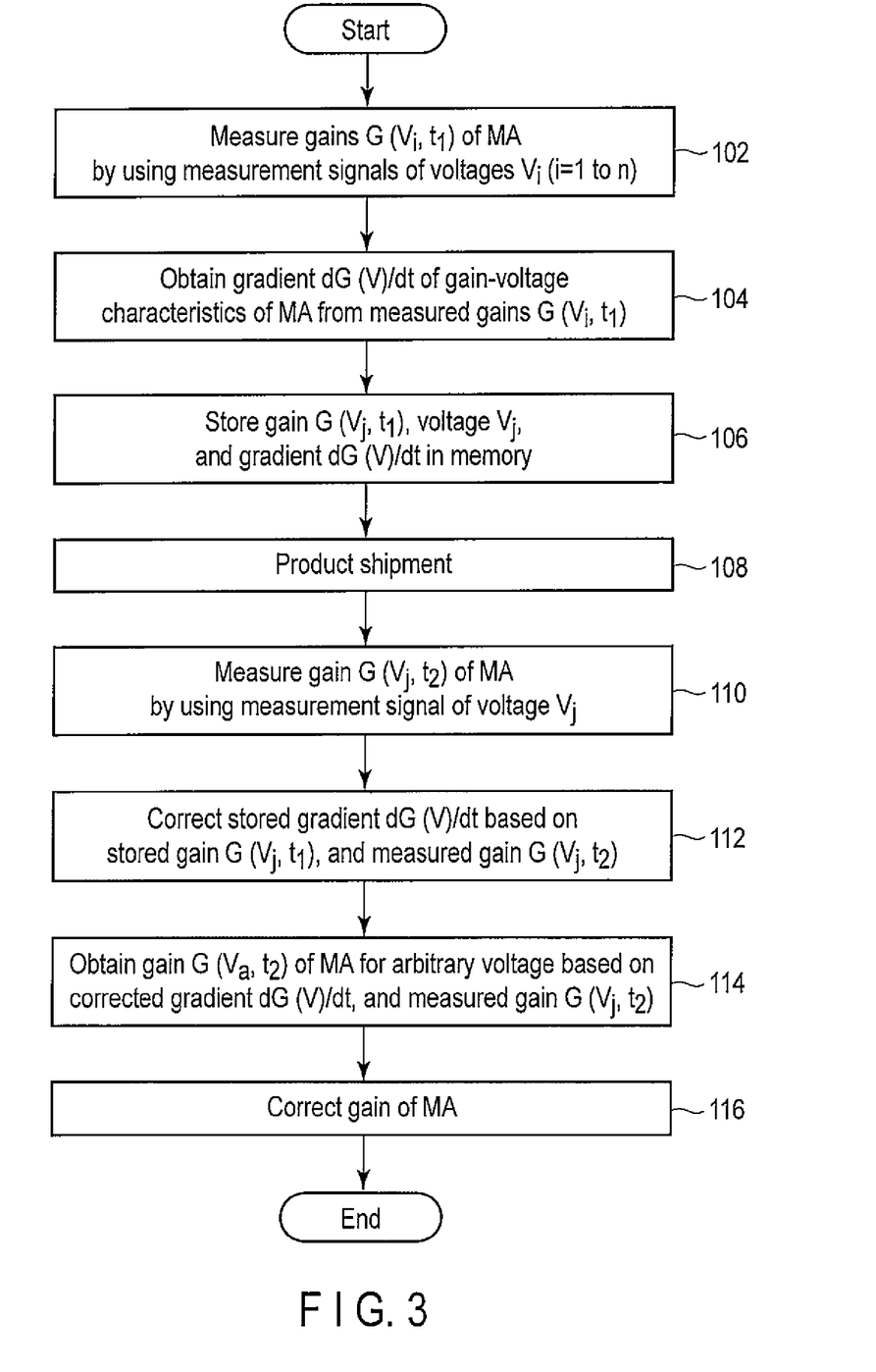
FIG. 3 is a flowchart showing an example of a gain adjustment operation of a microactuator of the embodiment.

An example of a gain adjustment operation of the MA 22 will be described below with reference to the flowchart of FIG. 3. Before shipment, in block 102, in the state where the output of the MA controller 50 is made 0 as described above, and the magnetic head 18 is positioned (on-track) by using only the VCM 20 and without using the MA 22, a plurality of gains G ($v_i$, $t_1$) of the MA 22 are measured by applying a plurality of different gain measurement voltages $V_i$ (i=1 to n; it is assumed that $V_1$ is the lowest, and $V_n$ is the highest). In the process before shipment, there is sufficient measurement time, and hence a plurality gains are measured by using a plurality of measurement voltages as described above. It is not necessary for the plurality of measurement voltages to be such small voltages as those at the on-track time. As at least one of the plurality of measurement voltages, a high voltage is used in order to shorten the operation time for gain estimation under the circumstances in which a lot of time cannot be spared for gain measurement after shipment. When a high voltage is applied to the MA 22, the displacement of the MA 22 caused by measurement signal in the position error signal is large, and measurement error of the gain of the MA 22 is small, whereby it is possible to measure a plurality of gains within a short time with high accuracy.

On the basis of the plurality of gains G ($V_i$, $t_1$) measured in block 102, a gradient dG (V)/dv of the gain-voltage characteristics of the MA 22 is obtained in block 104. The MA 22 has voltage characteristics in which the gain changes to be linear depending on the input voltage, and hence the gradient dG (V)/dv of the gain-voltage characteristics is a constant. The gradient of the gain-voltage characteristics is obtained by the least squares method or the like.

At least any one gain G ($V_j$, $t_1$) of the plurality of gains G ($V_i$, $t_1$) measured in block 102, voltage $V_j$ corresponding to the gain G ($V_j$, $t_1$), and gradient dG (V)/dv of the gain-voltage characteristics of the MA 22 obtained in block 104 are stored in a nonvolatile memory in block 106. Although not shown, the memory is present inside the positioning controller 34. After this, the product is shipped in block 108.

Hereafter, the process is the process after the shipment and, in order to correct the output voltage of the MA controller 50, the gain of the MA 22 is measured, and the correction amount α of the gain corrector 52 is determined. It is sufficient if this operation is executed at an arbitrary timing, and the operation may be carried out each time the magnetic disk device is turned on, or may be carried out at predetermined intervals, or may be carried out when the tracking becomes unstable. For example, when the power is turned on, a gain measurement voltage $V_j$ is applied to the MA 22 in block 110, and the gain G ($V_j$, $t_2$) of the MA 22 is measured. At this time, the measurement voltage is a high voltage, and hence the displacement of the MA 22 caused by measurement signal in the position error signal is large, the measurement error of the gain of the MA 22 is small, and it is possible to measure the gain within a short time with high accuracy.

The gradient dG (V)/dv of the gain-voltage characteristics stored in the memory in block 106 is corrected in block 112 based on the gain G ($V_j$, $t_1$) stored in block 106, and gain G ($V_j$, $t_2$) measured in block 110.

This correction is carried out as compensation for the secular change in the gradient dG (V)/dv. Details thereof will be described later.

On the basis of the gain G ($V_j$, $t_2$) measured in block 110, and gradient dG (V)/dv of the gain-voltage characteristics corrected in block 112, it is possible in block 114 to obtain the gain G ($V_a$, $t_2$) of the MA 22 for an arbitrary application voltage. The arbitrary voltage $V_a$ includes the on-track voltage at the time of actual usage.

In block 116, the correction amount of the gain corrector 52 is determined based on the gain G ($V_a$, $t_2$), and the gain of the MA 22 is adjusted.

Next, the correction of the gradient of the gain-voltage characteristics of the MA 22 in block 112 will be described below. The cause of the secular change in the gain of the MA 22 is the secular change of the adhesive fixing the piezoelectric device, and it can be expressed as follows.

$$F = k_1 \times x_1 \quad (1)$$

$$F = k_2 \times x_2 \quad (2)$$

Here, F denotes force, k denotes stiffness, and x denotes displacement.

It is assumed that equation (1) expresses the initial state, equation (2) expresses after use state, and the stiffness has changed from $k_1$ to $k_2$ due to deterioration of the adhesive.

From equation (1) and equation (2), the displacement after the secular change can be expressed as follows.

$$x_2 = (k_1/k_2) \times x_1 \quad (3)$$

Accordingly, it can be seen that the gradient and intercept of the gain-voltage characteristics becomes ($k_1/k_2$) times due to the secular change. In accordance with a ratio between gains of the MA 22 obtained before the shipment (initial state), and after the shipment (after change over time) by using the same measurement voltage, ($k_1/k_2$) can be found, and by multiplying the application voltage of the MA 22 by ($k_1/k_2$), the gradient of the gain can be corrected.

Figure 4:
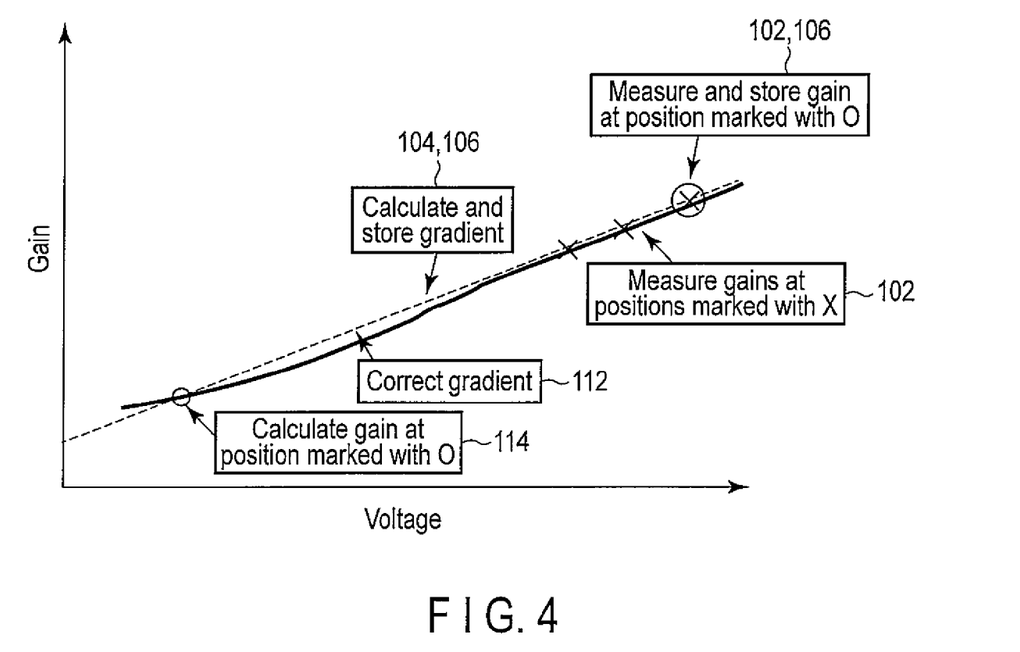
FIG. 4 is a view showing an example of correction of gain-voltage characteristics of the microactuator of the embodiment.

FIG. 4 shows an example of correction of the gain-voltage characteristics according to this embodiment. Gains at three positions marked with "x" are measured before shipment by using gain measurement signals of three comparatively high voltages (for example, 8.5 V, 7.5 V, and 7 V) (block 102). From the gains of these three positions, a gradient of the gain-voltage characteristics is obtained as indicated by the broken line, and the obtained gradient is stored in the memory (blocks 104, and 106). In the memory, the highest voltage (8.5 V), and gain thereof are stored (block 106). In block 112, the gradient is corrected, and the gain of the voltage at the time of on-track (for example, 2 V) is calculated from the gain-voltage characteristics of the corrected gradient (block 114).

Figure 5:
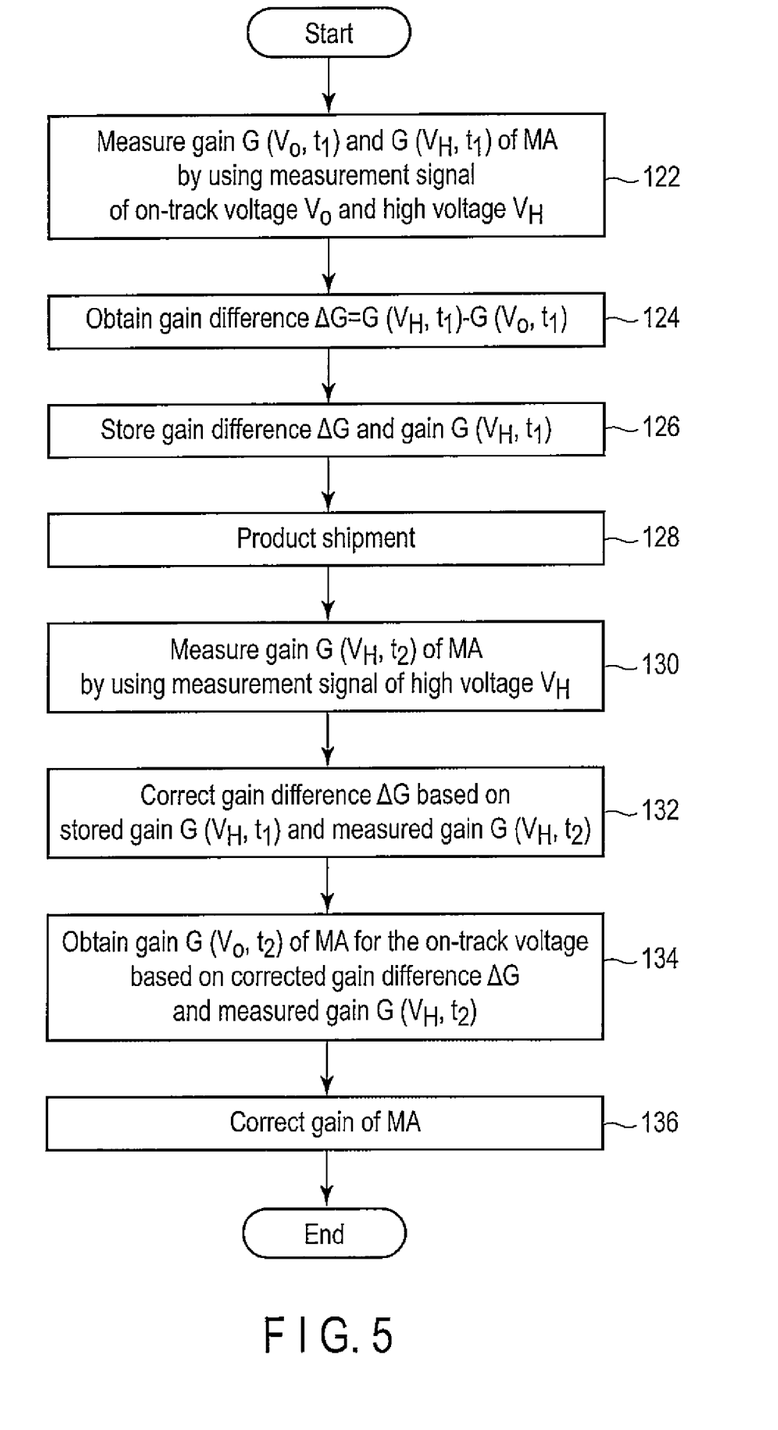
FIG. 5 is a flowchart showing another example of a gain adjustment operation of the microactuator of the embodiment.

Next, another example of the gain adjustment operation of the MA 22 will be described below with reference to the flowchart of FIG. 5. In the above-mentioned operation example, although when there is sufficient time before shipment of the product, gains of a plurality of voltages are measured, the gradient of the gain-voltage characteristics is obtained, change-over-time of the gradient is compensated for after the shipment, thereafter gain is measured once by using the high voltage, and the gain of the voltage at the time of on-track is calculated from the gradient after the compensation, in another example to be described below, however, gains of two voltages including a high voltage, and small voltage at the time of on-track are measured before shipment, a difference between the two gains is obtained, the change-over-time of the difference is compensated for after the shipment, thereafter a gain is measured once by using the high voltage, and then the gain of the voltage at the time of on-track is calculated from the difference after the compensation.

Before shipment, in block 122, in a state where an output of the MA controller 50 is made 0, and the magnetic head 18 is positioned (on-track) by only using the VCM 20 without using the MA 22, gains G ($V_o$, $t_1$) and G ($V_H$, $t_1$) of the MA 22 of two voltages including a high voltage $V_H$ (for example, 8.5 V) and small voltage $V_o$ (for example, 2 V) at the time of on-track are measured.

A difference between the two gains G ($V_o$, $t_1$) and G ($V_H$, $t_1$) measured in block 122, i.e., ΔG (=G ($V_H$, $t_1$)−($V_o$, $t_1$)) is obtained in block 124. The difference between the two gains can also be regarded as the gradient of the gain-voltage characteristics.

The gain G ($V_H$, $t_1$) of the high voltage measured in block 122, and gain difference ΔG obtained in block 124 are stored in the memory in the positioning controller 34 in block 126. After this, product shipment is carried out in block 128.

In block 130 after the shipment, the gain measurement high voltage VH is applied to the MA 22, and the gain G ($V_H$, $t_2$) of the MA 22 is measured.

The gain difference ΔG stored in the memory in block 126 is corrected in block 132 based on the gain G ($V_H$, $t_1$) stored in the memory in block 126, and gain G ($V_H$, $t_2$) measured in block 130. This correction is the compensation for the secular change of the difference ΔG. The details thereof are identical to the case of the above-mentioned first operation example.

It is possible to obtain the gain G ($V_o$, $t_2$) of the MA 22 for the on-track voltage in block 134 based on the gain G ($V_H$, $t_2$) measured in block 130, and gain difference ΔG corrected in block 132.

In block 136, the correction amount of the gain corrector 52 is determined based on the gain G ($V_o$, $t_2$), and the gain of the MA 22 is adjusted.

Figure 6:
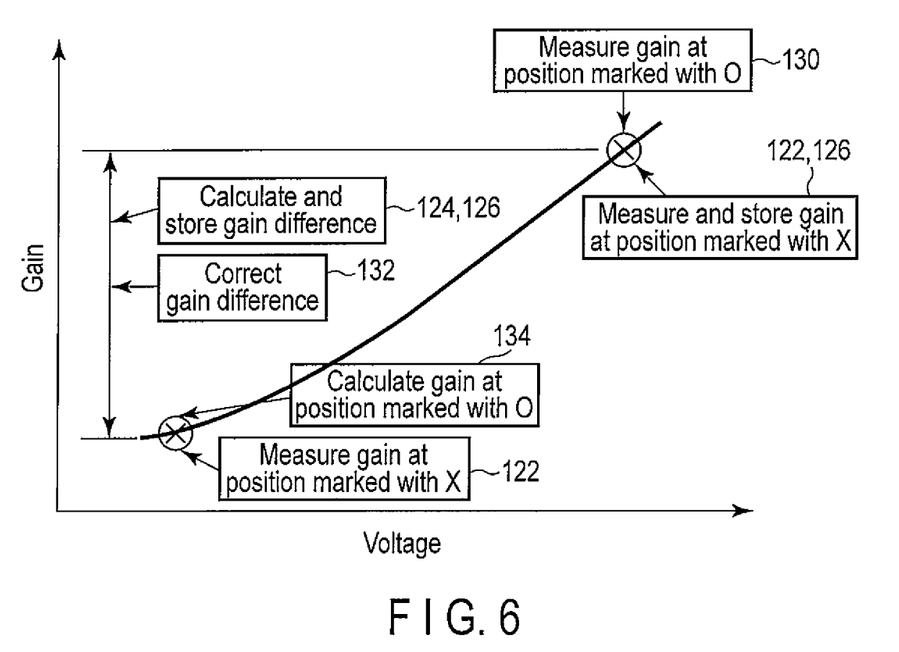
FIG. 6 is a view showing another example of correction of gain-voltage characteristics of the microactuator of the embodiment.

FIG. 6 shows an example of correction of the gain-voltage characteristics based on another operation example. Before shipment, gains at two positions marked with x are measured by using two gain measurement signals of the high voltage $V_H$, and small voltage $V_o$ at the time of on-track (block 122). From the gains of these two positions, a gain difference is obtained, and the obtained gain difference is stored in the memory (blocks 124 and 126). In the memory, the gain of the high voltage $V_H$ is also stored (block 126). In block 132, the gain difference is corrected, and the gain of the small voltage $V_o$ at the time of on-track is calculated from the corrected gain difference (block 134).

Figure 7A:
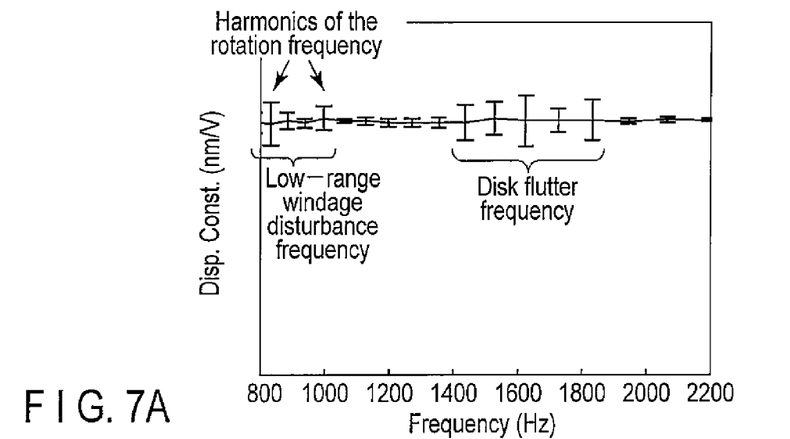
FIGS. 7A, 7B, and 7C are views each showing frequency characteristics of gain measurement signals of the embodiment.
Figure 7B:
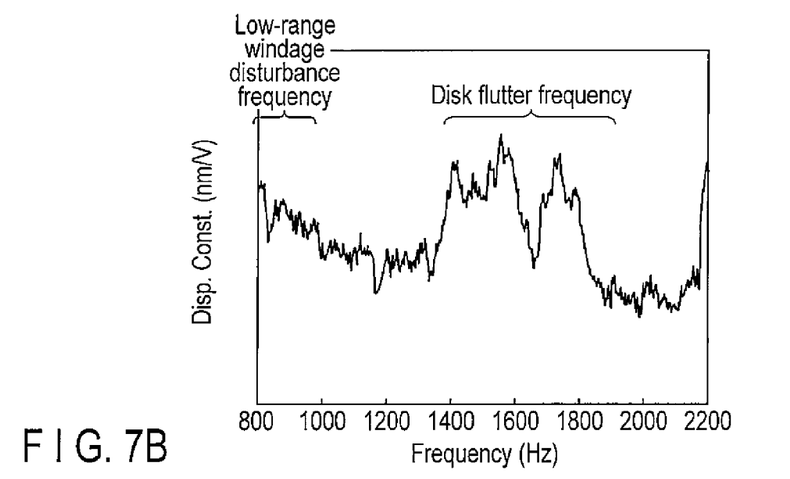
Figure 7C:
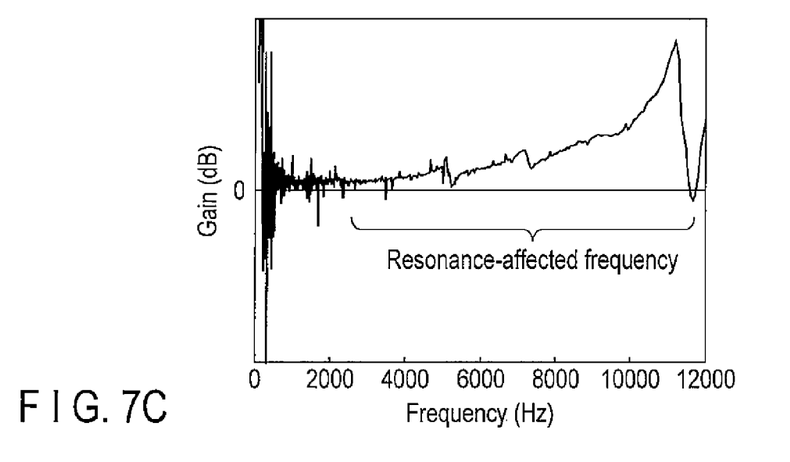

Next, the gain measurement signal will be described below with reference to FIGS. 7A to 7C used for frequency selection of the gain measurement signal. FIG. 7A is a view showing average values and standard deviation of a case where an MA gain is measured a plurality of times for each frequency. FIG. 7B is a view showing the spectrum of the position error signal. FIG. 7C is a view showing the frequency characteristics of the MA gain. As shown in FIGS. 7A and 7B, regarding the gain measurement signal, at a low-range windage disturbance frequency (frequency at which the windage disturbance is large), harmonics of the disk rotation, and disk flutter frequency, the position error is large, and accurate measurement cannot be carried out. Further, as shown in FIG. 7C, at a resonance-affected frequency (frequency affected by the fundamental resonance frequency of the MA 22), the MA gain is affected by the resonance, and hence an accurate MA gain cannot be measured. Accordingly, it is desirable that sinusoidal waves having frequencies excluding these frequencies be employed.

As has been described above, according to the first embodiment, at the time before shipment, while the measurement time can be sufficiently taken, in a state where the output of the MA controller 50 is made 0, and the magnetic head 18 is positioned (on-track) by using only the VCM 20 without using the MA 22, at least two gain measurement voltages are applied to the MA 22. When the gradient of the gain-voltage characteristics is to be obtained from the measurement result, two or more, i.e., a number of voltages are applied. The two or more voltages include at least a high voltage. When two voltages are applied, a high voltage, and small voltage at the time of on-track are used, and a difference between gains of both the voltages is obtained. The gradient or the difference, and the gain value measured by using the high voltage are stored in the memory. In this manner, the gain is measured by using the high voltage, and hence the gain can be measured with high accuracy within a short time. In the measurement using the small voltage, the amplitude of the piezoelectric device is small, and the measurement accuracy of the gain is poor.

After shipment, the gain is measured within a short time by applying the high voltage. From the measured gain, and gain which has been measured by also using the high voltage, and stored in the memory, the gradient or the difference which has been stored in the memory is corrected in order to compensate for the change-over-time of the MA 22. After this, based on the measured gain, and gradient or difference after correction, the gain at the time of on-track is calculated. Accordingly it is possible to obtain the gain with high accuracy within a short time. Accordingly, it is possible to compensate for the variation in gain for each of the piezoelectric devices of the two-stage actuator within a short time, and enhance the accuracy of head drive achieved by the piezoelectric devices.

Although the embodiment has been described by taking the magnetic disk device using the two-stage actuator employing the piezoelectric devices as the head drive mechanism as an example, the embodiment is not limited to the magnetic disk device and, the magnetic disk device is not limited to the two-stage actuator, and the embodiment can be applied to all actuators using piezoelectric devices.

The various modules of the systems described herein can be implemented as software applications, hardware and/or software modules, or components on one or more computers, such as servers. While the various modules are illustrated separately, they may share some or all of the same underlying logic or code.

Although the embodiment has been described by taking the magnetic disk device using the two-stage actuator employing the piezoelectric devices as the head drive mechanism as an example, the embodiment is not limited to the magnetic disk device and, the magnetic disk device is not limited to the two-stage actuator, and the embodiment can be applied to all actuators using piezoelectric devices. While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A piezoelectric device drive method comprising:
   measuring gains including a first gain by applying voltages including a first voltage to a piezoelectric device at a first timing;
   calculating gain characteristics associated with the applied voltages from the measured gains;
   measuring a second gain by applying the first voltage to the piezoelectric device at a second timing;
   correcting the gain characteristics based on the first gain and the second gain; and
   calculating a third gain based on the corrected gain characteristics and the second gain in a case where a second voltage other than the first voltage is applied.

2. The method of claim 1, further comprising:
   controlling a drive voltage of the piezoelectric device based on the calculated third gain.

3. The method of claim 1, wherein
   the measuring the gains comprises measuring two or more gains including the first gain by applying two or more voltages including the first voltage to the piezoelectric device, the two or more voltages being higher than the second voltage,
   the calculating the gain characteristics comprises calculating a gradient of gain-voltage characteristics from the two or more gains, and
   the calculating the third gain comprises calculating a gain of the second voltage.

4. The method of claim 3, wherein
   the correcting the gain characteristics comprises multiplying the gradient of the gain-voltage characteristics by a ratio of the first gain to the second gain.

5. The method of claim 1, wherein
   the measuring the gains comprises measuring two gains by applying the first voltage and the second voltage to the piezoelectric device,
   the calculating the gain characteristics comprises calculating a gain difference from the two gains, and
   the calculating the third gain comprises calculating a gain of the second voltage from the second gain.

6. The method of claim 5, wherein
   the correcting the gain characteristics comprises multiplying the gain difference by a ratio of the gain measured by applying the first voltage to the second gain.

7. A piezoelectric device drive apparatus comprising:
a first measuring module configured to measure gains including a first gain by applying voltages including a first voltage to a piezoelectric device at a first timing;
a first calculator configured to calculate gain characteristics associated with the applied voltages from the measured gains;
a second measuring module configured to measure a second gain by applying the first voltage to the piezoelectric device at a second timing;
a correcting module configured to correct the calculated gain characteristics based on the first gain and the second gain; and
a second calculator configured to calculate a third gain based on the corrected gain characteristics and the second gain in a case where a second voltage other than the first voltage is applied.

8. The apparatus of claim 7, further comprising:
a controller configured to control a drive voltage of the piezoelectric device based on the calculated third gain.

9. The apparatus of claim 7, wherein
the first measuring module comprises a module configured to measure two or more gains including the first gain by applying two or more voltages including the first voltage to the piezoelectric device, the two or more voltages being higher than the second voltage,
the first calculator comprises a module configured to calculate a gradient of gain-voltage characteristics from the two or more gains, and
the second calculator comprises a module configured to calculate a gain of the second voltage.

10. The apparatus of claim 9, wherein
the correcting module comprises module configured to multiply the gradient of the gain-voltage characteristics by a ratio of the first gain to the second gain.

11. The apparatus of claim 7, wherein
the first measuring module comprises a module configured to measure two gains by applying the first voltage and the second voltage to the piezoelectric device,
the first calculator comprises a module comprises a module configured to calculate a gain difference from the two gains, and
the second calculator comprises a module configured to calculate a gain of the second voltage from the second gain.

12. The apparatus of claim 11, wherein
the correcting module comprises a module configured to multiply the gain difference by a ratio of the gain measured by applying the first voltage to the second gain.

13. A magnetic disk apparatus comprising:
a dual-stage actuator comprising a piezoelectric device configured to drive a head and a coarse actuator configured to drive an arm holding the piezoelectric device;
a first measuring module configured to measure gains including a first gain by applying voltages including a first voltage to the piezoelectric device at a first timing;
a first calculator configured to calculate gain characteristics associated with the applied voltages from the measured gains;
a second measuring module configured to measure a second gain by applying the first voltage to the piezoelectric device at a second timing;
a correcting module configured to correct the gain characteristics based on the first gain and the second gain;
a second calculator configured to calculate a third gain based on the corrected gain characteristics, and the second gain in a case where a second voltage other than the first voltage is applied; and
a controller configured to control a drive voltage of the piezoelectric device based on the calculated third gain.

14. The apparatus of claim 13, wherein the applied voltage comprises a sinusoidal signal comprising frequencies other than a low-range windage disturbance frequency, harmonics of the disk rotation frequency, a disk flutter frequency, and a resonance-affected frequency of the piezoelectric device.

15. The apparatus of claim 13, wherein
the first measuring module comprises a module configured to measure two or more gains including the first gain by applying two or more voltages including the first voltage to the piezoelectric device, the two or more voltages being higher than the second voltage,
the first calculator comprises a module configured to calculate a gradient of gain-voltage characteristics from the two or more gains, and
the second calculator comprises a module configured to calculate a gain of the second voltage.

16. The apparatus of claim 15, wherein
the correcting module comprises module configured to multiply the gradient of the gain-voltage characteristics by a ratio of the first gain to the second gain.

17. The apparatus of claim 13, wherein
the first measuring module comprises a module configured to measure two gains by applying the first voltage and the second voltage to the piezoelectric device,
the first calculator comprises a module comprises a module configured to calculate a gain difference from the two gains, and
the second calculator comprises a module configured to calculate a gain of the second voltage from the second gain.

18. The apparatus of claim 17, wherein
the correcting module comprises a module configured to multiply the gain difference by a ratio of the gain measured by applying the first voltage to the second gain.

* * * * *